(12) United States Patent
Kim

(10) Patent No.: US 9,545,577 B2
(45) Date of Patent: Jan. 17, 2017

(54) METHOD AND SYSTEM FOR RENEWING SCREEN USING MECHANICS INFORMATION

(75) Inventor: Dae Il Kim, Jeollanam-do (KR)

(73) Assignee: NHN Entertainment Corporation, Seongnam-si (KR)

( * ) Notice: Subject to any disclaimer, the term of this patent is extended or adjusted under 35 U.S.C. 154(b) by 1773 days.

(21) Appl. No.: 11/702,751

(22) Filed: Feb. 6, 2007

(65) Prior Publication Data

US 2007/0167231 A1 Jul. 19, 2007

Related U.S. Application Data

(63) Continuation of application No. PCT/KR2005/002591, filed on Aug. 10, 2005.

(30) Foreign Application Priority Data

Aug. 13, 2004 (KR) .................. 10-2004-0063825

(51) Int. Cl.
*A63F 13/52* (2014.01)
*A63F 13/358* (2014.01)
(Continued)

(52) U.S. Cl.
CPC ............... *A63F 13/52* (2014.09); *A63F 13/12* (2013.01); *A63F 13/358* (2014.09); *A63F 13/57* (2014.09);
(Continued)

(58) Field of Classification Search
CPC .................. G07F 17/3225; G06F 3/04815
(Continued)

(56) References Cited

U.S. PATENT DOCUMENTS 6,061,004 A * 5/2000 Rosenberg ..................... 341/20
6,078,308 A * 6/2000 Rosenberg et al. ........... 715/856
(Continued)

FOREIGN PATENT DOCUMENTS

JP 2002-045572 2/2002
JP 2002-292139 10/2002
(Continued)

OTHER PUBLICATIONS

Super Mario 64 game manual www.replacementdocs.com.*
(Continued)

*Primary Examiner* — David L Lewis
*Assistant Examiner* — Eric M Thomas
(74) *Attorney, Agent, or Firm* — H.C. Park & Associates, PLC

(57) ABSTRACT

A screen update method and system is provided. The game server performs the steps of: receiving dynamics information from a first gamer's terminal; and transmitting the received dynamics information to at least one second gamer's terminal. The first gamer's terminal performs the steps of: performing dynamics computation by using the dynamics information; and updating a display screen displayed on a display unit of the first gamer's terminal provided by the game server by using result information of the dynamics computation. The second gamer's terminal performs the steps of: performing dynamics computation by using the received dynamics information; and updating a display screen displayed on a display unit of the second gamer's terminal provided by the game server by using result information of the dynamics computation performed in the second gamer's terminal.

22 Claims, 6 Drawing Sheets

(51) Int. Cl.
*A63F 13/57* (2014.01)
*A63F 13/30* (2014.01)

(52) U.S. Cl.
CPC ...... *A63F 2300/534* (2013.01); *A63F 2300/64* (2013.01); *A63F 2300/66* (2013.01); *A63F 2300/807* (2013.01)

(58) Field of Classification Search
USPC .................................... 463/1, 30–34, 40–42
See application file for complete search history.

(56) References Cited

U.S. PATENT DOCUMENTS

| | | |
|---|---|---|
| 6,884,163 B2 | 4/2005 | Namba et al. |
| 2002/0016195 A1 | 2/2002 | Namba et al. |
| 2002/0142834 A1 | 10/2002 | Sobue |
| 2004/0039934 A1* | 2/2004 | Land et al. .................. 713/200 |

FOREIGN PATENT DOCUMENTS

| | | |
|---|---|---|
| KR | 1020010055371 A | 7/2001 |
| KR | 1020020011346 A | 2/2002 |
| KR | 1020020029540 A | 4/2002 |
| KR | 1020020073313 A | 9/2002 |

OTHER PUBLICATIONS

International Search Report and Written Opinion of ISA issued in International Application No. PCT/KR2005/002591.
Office Action issued on Nov. 24, 2004 in the priority Korean Patent Application No. 10-2004-0063825.

* cited by examiner

METHOD AND SYSTEM FOR RENEWING SCREEN USING MECHANICS INFORMATION

CROSS-REFERENCE TO RELATED APPLICATIONS

This application is a continuation application under 35 U.S.C. §365(c) of International Application No. PCT/KR2005/002591, filed Aug. 10, 2005, designating the United States, which claims the benefit of Korean Patent Application No. 10-2004-0063825 filed Aug. 13, 2004. This application incorporates herein by reference the International Application No. PCT/KR2005/002591 and the Korean Patent Application No. 10-2004-0063825 in their entirety.

BACKGROUND

The present invention relates to a method of updating a screen by using a plurality of gamers' terminals connected to a game server providing an online game via a network and a system employing the method, and more particularly, to a screen update method and system in which a server of an online game such as 3D MMORPG providing a three-dimensional game screen transmits dynamics information received from a predetermined gamer's terminal to at least one associated gamer's terminal such that dynamics computation and display screen updates are performed by using the dynamics information, respectively, in each gamer's terminal.

Background Art

Recently, various kinds of network game services based on three-dimensional graphics are gradually becoming more widely provided than network games based on based on two-dimensional graphics. To provide the network game service based on the three-dimensional graphics, it is essential that a screen is updated in real-time.

In the network game service based on the three-dimensional graphics, images forming a game, include general three-dimensional images such as buildings, trees, and mountains and three-dimensional rigid images such as spheres, cylinders, and boxes. In case that the rigid images are generated or updated, the amount of information that has to be computed is more than the general images and a relatively large amount of time is consumed.

For example, in case of 3D Massively Multi-player Online Role Playing Game (MMORPG) in which a plurality of gamers connect via network and play a game, in case that a request of updating a predetermined rigid image is generated by a gamer's terminal, to update the display screen of the gamer's terminal and the display screen of a plurality of gamers' terminals associated with the gamer's terminal, a game server provides information required in updating the screen to each gamer's terminal so that the screen is updated by using the information in each gamer's terminal.

In case that the path or velocity of a ball is determined according to physical law, such as a case in which a player character hurls a ball, according to a technology, a game server has compute, according to physical law, the path or velocity of the ball, and provide the results to each gamer's terminal.

However, the described method has a problem in which the amount of dynamics computation that has to be processed by a game server is overwhelmingly increased in case that each of many gamers generates the request. Accordingly, the result of the dynamics computation provided to each gamer may be delayed.

Namely, since the amount of data to be processed is rapidly increased and the request of processing other data for playing the game is difficult to respond to, the reaction with respect to an action of a player character is difficult to be performed in a timely manner.

Accordingly, an update screen method and system which can solve the problems as described above are required.

SUMMARY

In one embodiment, the present invention provides a screen update method and system in which an online game server transmits dynamics information generated in each gamer's terminal to other gamer's terminal connected to the identical game map and dynamics computation and display screen update are performed, respectively, by using the transmitted dynamics information in each gamer's terminal.

In another embodiment of the present invention, dynamics computation and display screen update are performed in each gamer's terminal instead of a game server, thereby reducing the amount of data processed by the game server. Particularly, the amount of the data processed by the game server is reduced, thereby smoothly providing 3D MMORPG services without increasing the quality and quantity of the game server(s).

The game server rapidly transmits and relays dynamics information required in each gamer's terminal to the gamer's terminal, thereby reducing the time required in generating game screen image updated in the gamer's terminal.

According to an aspect of the present invention, there is provided a method of updating a screen by using a plurality of gamers' terminals connected to a game server providing an online game via a network, wherein the game server performs: a step of receiving dynamics information of a predetermined rigid object from a first gamer's terminal; and a step of transmitting the received dynamics information to at least one second gamer's terminal associated with the first gamer's terminal, the first gamer's terminal performs: a step of performing dynamics computation by using the dynamics information; and a step of updating a display screen displayed on a display unit of the first gamer's terminal in association with a game provided by the game server by using result information of the dynamics computation, the second gamer's terminal performs: a step of performing dynamics computation by using the received dynamics information; and a step of updating a display screen displayed on a display unit of the second gamer's terminal by using result information of the dynamics computation performed in the second gamer's terminal, where the rigid object operates according to geostatics, in association with a game provided by the game server.

According to another aspect of the present invention, there is provided a system of updating a screen by using a plurality of gamer terminals connected to a game server via a network, the game server include: a dynamics information receiving unit receiving predetermined dynamics information from a first gamer's terminal; and a dynamics information transmitting unit transmitting the received dynamics information to at least one second gamer's terminal associated with the first gamer's terminal; the first gamer's terminal including: a first dynamics computation performing unit performing dynamics computation by using the dynamics information; and a first screen update unit updating a display screen displayed on a display unit of the first gamer's terminal by using result information of the dynamics computation in association with a game provided by the game server; the second gamer's terminal including: a second dynamics computation performing unit performing dynamics computation by using the received dynamics information; and a second screen update unit updating a display screen displayed on a display unit of the second gamer's terminal by using the result information of the dynamics computation in association with the game provided by the game server.

One aspect of the invention provides a method of updating a screen in a computer network. In the method, a server performs the steps of: receiving motion information of an object from a first terminal; and transmitting the received motion information to a second terminal communicating with the first terminal.

The first terminal is configured to perform motion computation based at least in part on the motion information, and configured to update the display screen of the first terminal. The display screen is associated with a game provided by the server, and said updating is based at least in part on the motion computation.

The second terminal is configured to perform motion computation based at least in part on the received motion information, and configured to update the display screen of the second terminal the display screen being associated with the game provided by the game server. Said updating is based at least in part on the motion computation performed in the second terminal.

Other aspect of the invention provides a computer readable recording medium, in which a program for executing the method is recorded.

Another aspect of the invention provides a method of updating display screens of a first terminal and a second terminal connected to a server in a computer network. In the method, the server performs the steps of: receiving motion information of an object from the first and second terminals; adjusting a first motion information received from a first terminal such that the received motion information is substantially compatible with the received motion information received from the second terminal communicating with the first terminal; and transmitting at least a part of the received motion information received from the first terminal and the adjusted motion information to the second terminal.

The motion information may comprise mechanics information, and wherein the mechanics information comprises dynamics information and statics information of the object. The dynamics information may comprise attack point, magnitude of force, direction of force, effect of attack, and counter force of the object. The motion information may comprise dynamics information of the object interacting with a background. The adjusting may be performed periodically.

The method may further comprise: transmitting the motion information of the first and second terminals to a third terminal that newly logged on the server; and generating a display screen for the third terminal. The object may comprise a rigid body, and adjusting may be performed by geostatics.

Still another aspect of the invention provides a computer readable recording medium, in which a program for executing the method of the above is recorded.

Still another aspect of the invention provides a method of updating a display screen of a first terminal connected to a server and a plurality of terminals in a computer network. In the method, the first terminal performs the steps of: receiving motion information of an object in the plurality of terminals from the server; performing motion computation to produce computed motion information by using the first terminal's own motion information and the motion information received from the server; and updating the display screen using the first terminal's own motion information and the computed motion information.

The motion information of the first terminal may comprise motion information generated by a plurality of control commands inputted at the first terminal by a user with respect to the object in a background. The motion information may comprise dynamics information and statics information of the object. The dynamics information may comprise attack point, magnitude of force, direction of force, effect of attack, and counter force of the object. The object may comprise a rigid body, and wherein adjusting is performed by geostatics.

Still another aspect of the invention provides a computer readable recording medium, in which a program for executing the method of the above is recorded.

Still another aspect of the invention provides a system of updating a screen of a plurality of terminals connected to a server via network. The server comprises: a motion information receiver receiving motion information from a first terminal; and a motion information transmitter transmitting the received motion information to at least one second terminal communicating with the first terminal.

Still another aspect of the invention provides a first terminal comprises: a first motion computer performing motion computation by using the motion information; and a first screen updater updating a display screen of the first terminal, the display screen being associated with a game provided by the server, said updating being based at least in part on the motion computation.

Still another aspect of the invention provides a second terminal comprises: a second motion computer performing motion computation, said motion computation being based on the received motion information; and a second screen updater updating a display screen of the second terminal, said display screen being associated with the game.

One of the first terminal and the second terminal may further comprise a server communicator for transmitting the result of the motion computation to the server. The server may further comprise an adjuster adjusting such that the result of the motion computation of the first terminal is substantially compatible with the result of the motion computation of at least one terminal communicating with the first terminal.

The motion information may comprise mechanics information, and the mechanics information may comprise dynamics information and statics information of the object.

DETAILED DESCRIPTION OF EMBODIMENTS

Terms Used in the Present Specification

Rigid Object

A rigid object used in the present specification indicates an object, such as boxes, cylinders, and spheres of images in a game, that is not changed in shape or size even if being pressed by external force, and is ruled by geostatics. Also, in case that a rigid object is displayed in an online game, the rigid object is called as a rigid image.

Dynamics Information

Dynamics information used in the present specification indicates information on an attack point, force intensity, and the direction of the force of a predetermined object. A game screen image is updated according to result information computed by using dynamics information.

3) Rigid Object Included in a Background Image

In the present specification, a rigid object forms a background image. The rigid object is one of many background images in an online game and is an object used by a player character as an item. For example, in case that "a stone" included in background images in an online game is a rigid object, a player character may control the stone to be moved according to geostatics, such as lifting, transferring, or throwing the stone.

Hereinafter, a screen update method and system according to the present invention are described in detail with reference to the attached drawings.

Figure 1:
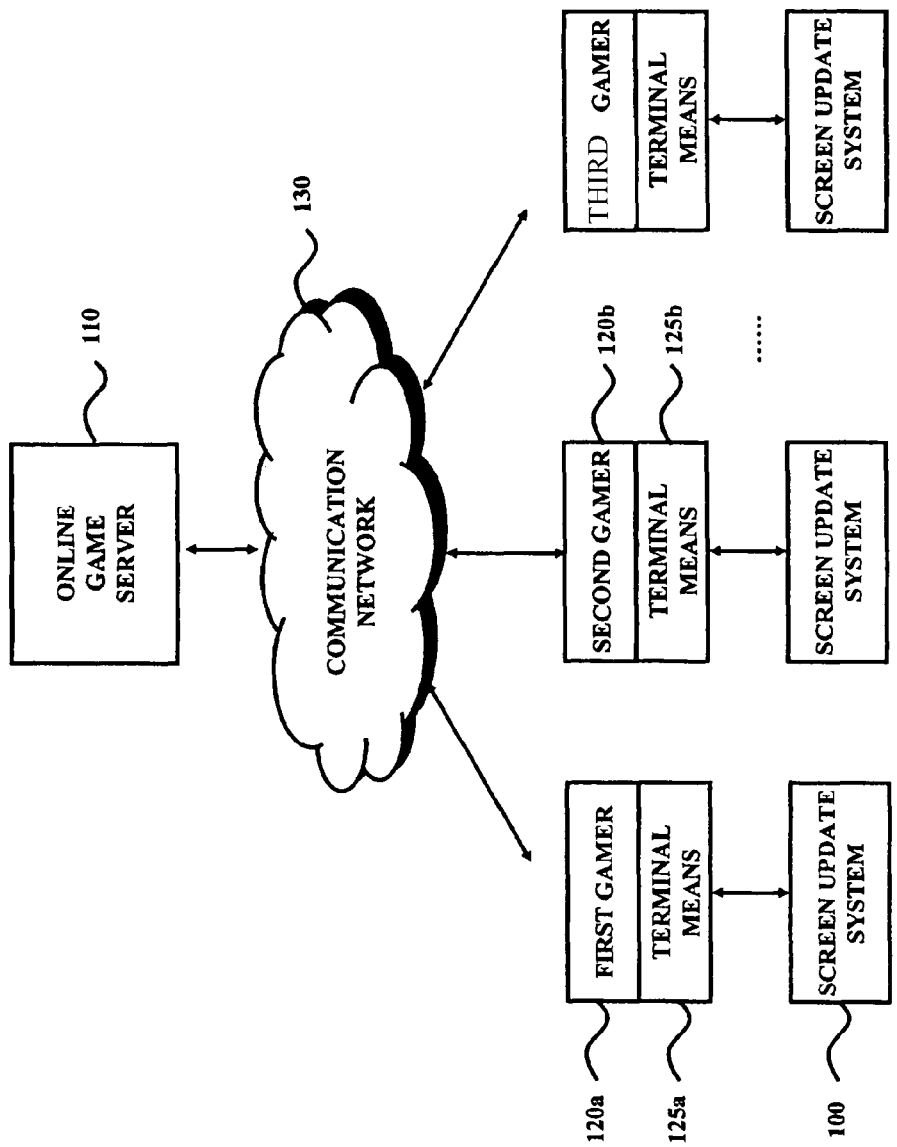
FIG. 1 is a diagram illustrating the network connection of a system performing a screen update method according to the present invention.

FIG. 1 is a diagram illustrating the network connection of a system performing the screen update method according to the present invention.

In case that a request for updating a predetermined rigid image is generated from the gamer's terminal 125a, a screen update system 100 updates the display screen of a terminal 125b of a gamer controlling a player character located in the same game map in which a player character of a gamer's terminal 125a is located.

The screen update system 100 may be embodied in terminals 125a and 125b driving an RPG in which a plurality of gamers play the game together, and more particularly, a Massively Multi-player Online Role Playing Game (MMORPG) in which a plurality of gamers concurrently play the game online via a broadband game zone. Though a case in which the screen update system 100 of the present invention is embodied in an RPG based on online is described in the present embodiment, it is obvious to those skilled in the art that the present invention may be applied to all kinds of image realization fields associated with image realization by using display units.

Also, the screen update system 100 may be embodied regardless of being inside or outside the terminal means 125a and 125b. For convenience of description, in the present embodiment, the screen update system 100 is installed in the terminal means 125a and 125b, which the gamers 120a and 120b have respectively, to update a predetermined rigid image.

The online game server 110 may indicate a game service server associated with MMORPG, which is connected to the terminals 125a and 125b of the gamers 120a and 120b via a communication network 130 and provides game services to the gamers 120a and 120b. In case that the gamers 120a and 120b access the online game server 110 by using the gamer's terminal 125a and 125b, in which a program associated with the game is installed, the online game server 110 transmits a game patch to the gamer's terminals 125a and 125b. The program associated with the game receives online game services by using the transmitted game performing data or game patch.

Also, the online game server 110 gives operation control authority of a predetermined player character to the gamers 120a and 120b and allows the gamers 120a and 120b to independently control the operation of the player character, thereby providing substantial game service.

The gamers 120a and 120b access the online game server 110 via the communication network 130 and may utilize the terminal means 125a and 125b for accessing the communication network 130. The gamers 120a and 120b perform a predetermined operation for playing the game. In case that update request information for a rigid image is generated according to the gamers' operations, the terminal means 125a and 125b transmit dynamics information with respect to the rigid image to the online game server 110.

The terminal means 125a and 125b designate an apparatus that can access a wired/wireless communication network as a terminal, and includes a memory device, and is able to operate by microprocessor, such as desktop PCs, notebook PCs, PDAs, and mobile communication terminals.

In the present specification, a terminal means generating dynamics information is designated as "a first gamer's terminal" and a terminal means receiving the dynamics information generated by the first gamer's terminal is designated as "a second gamer's terminal". However, this is divided only for convenience of description, and a terminal means is able to perform the function of the first gamer's terminal and the second gamer's terminal. In FIG. 1, hereinafter, the terminal means 125a functions as the first gamer's terminal and the terminal means 125b functions as the second gamer's terminal.

Figure 2:
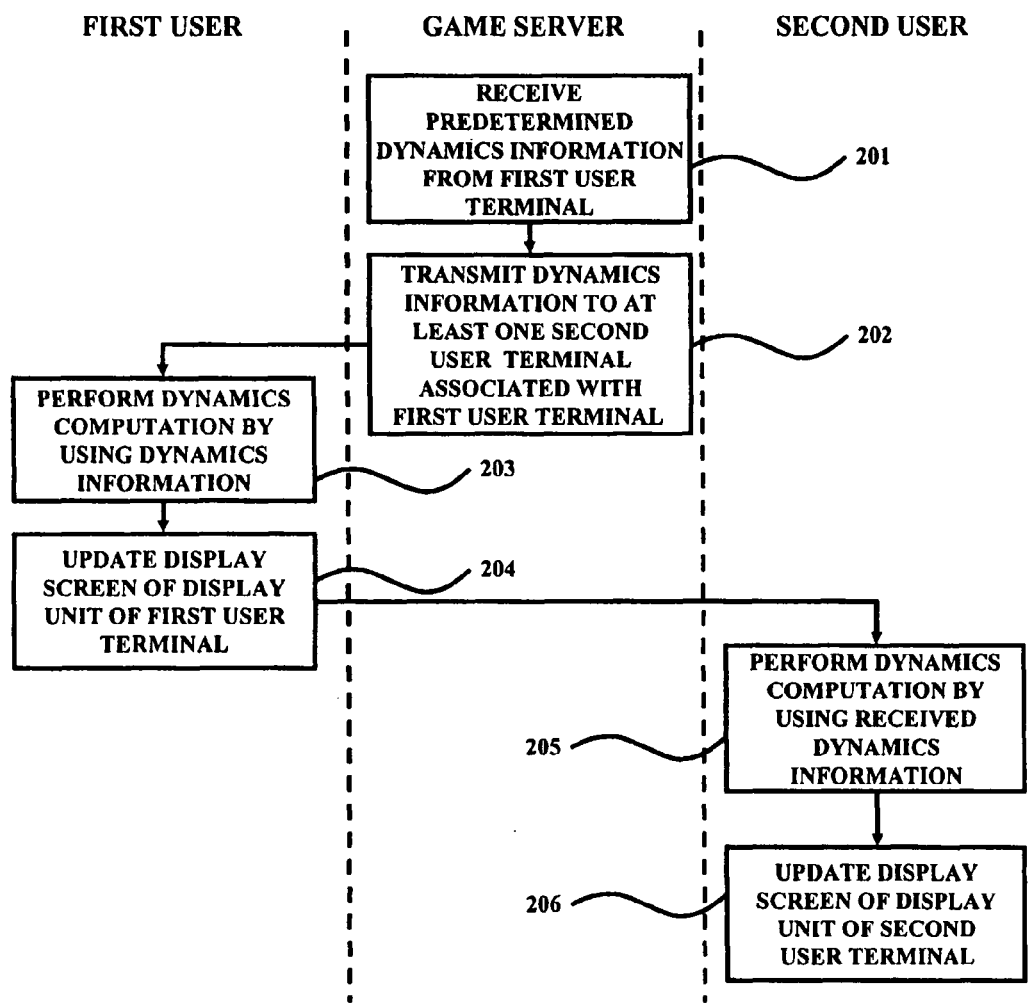
FIG. 2 is flow chart illustrating an example of the screen update method according to an embodiment of the present invention.

FIG. 2 is a flow chart illustrating an example of the screen update method according to an embodiment of the present invention. Hereinafter, the process of updating the screen in the first gamer's terminal and the second gamer's terminal may be performed by screen update systems installed in association with the first gamer's terminal and the second gamer's terminal, respectively.

In Step 201, the game server 110 receives predetermined dynamics information from the first gamer's terminal 125a. In case that an update request with respect to a predetermined rigid image is generated from the first gamer's terminal 125a, the first gamer's terminal 125a transmits dynamics information associated with the rigid image to the game server 110. The rigid image is an image of a rigid object, such as boxes, cylinders, and spheres, which are located in the game, that are not changed in shape or size even if external force is applied, and ruled by geostatics.

For example, the dynamics information includes at least an attack point, or force intensity, or the direction of the force, which are associated with a predetermined object on a display screen displayed in a display unit of the first gamer's terminal. The update request with respect to the rigid image may be generated during combat between player characters or movement. For example, in case that a command to attack other player characters by throwing a weapon, which is a rigid object, in the shape of sphere is inputted from the first gamer 120a, the first gamer's terminal 125a transmits information on the attack point, the intensity of the force, and the direction of the force, which are applied to the weapon in the shape of a sphere to the game server 110.

In Step 202, the game server 110 transmits the received dynamics information to at least one second gamer's terminal 125b associated with the first gamer's terminal 125a.

The second gamer's terminal associated with the first gamer's terminal may indicate the terminal of a second gamer having a player character located in the same game map in which the player character of the first gamer's terminal is located. Namely, the player character of the first gamer and the player character of the second gamer are located in the same game map. For example, the first player character and the second player character go into battle or move in the same game map.

In Step 203, the first gamer's terminal 125a performs dynamics computation by using the dynamics information. Before or after the dynamics information is transmitted to the online game server 110 or synchronized with the transmitting, the first gamer's terminal 125a performs dynamics computation by using the dynamics information. The first gamer's terminal 125a determines whether the weapon in the shape of a sphere is updated and displayed, by using the generated result information of the dynamics computation.

In Step 204, the first gamer's terminal 125a updates a display screen displayed in a display unit of the first gamer's terminal in association with the game provided by the game server, by using the result information of the dynamics computation. An image resource is loaded and the loaded image resource is rendered by using the result information of the dynamics computation, thereby performing the process of updating the display screen. To update the display screen, the first gamer's terminal 125a replaces a previous display screen with the rendered image resource by rendering the display screen at a predetermined rate.

Also, the second gamer's terminal 125b updates a display screen displayed in the second gamer's terminal 125b by using the dynamics information received via the game server 110.

In Step 205, the second gamer's terminal 125b performs dynamics computation by using the dynamics information received from the first gamer's terminal 125a via the game server 110. The dynamics computation of the second gamer's terminal 125b may be performed in the same way of performing the dynamics computation in the first gamer's terminal 125a.

In Step 206, a display screen displayed in a display unit of the second gamer's terminal 125b is updated in association with the game provided by the game server 110 by using the result information of the dynamics computation. To update the display screen, image resource process and rendering process may be performed by using the result information of the dynamics computatation. Hereinafter, referring to FIG. 3, a process of updating the display screen of the second gamer's terminal 125b will be described in detail.

Figure 3:
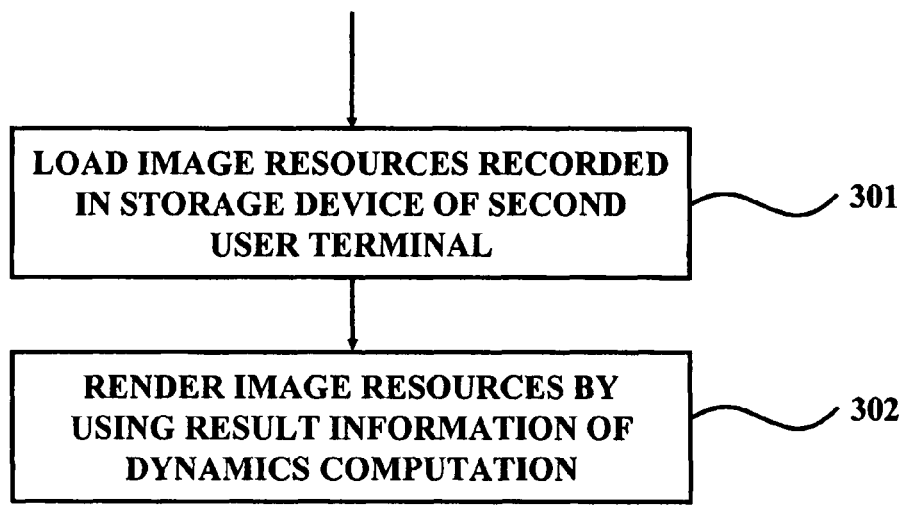
FIG. 3 is a diagram illustrating a process of updating a display screen displayed in a display unit of a second gamer's terminal, according to an embodiment of the present invention.

FIG. 3 is a diagram illustrating a process of updating the display screen displayed in the display unit of the second gamer's terminal 125b, according to an embodiment of the present invention.

As illustrated in FIG. 3, the process of updating the display screen of the second gamer's terminal 125b begins with a step of identifying an image resource required in updating from image resources recorded in a storage space of the second gamer's terminal 125b and loading the image resource to a buffer (Step 301). The second gamer's terminal 125b renders the loaded image resource by using result information of the dynamics computation (Step 302). For example, the second gamer's terminal 125b may determine a way of rendering image resources by using the computed result information, thereby determining the direction and the path in which the weapon, in the shape of a sphere, flies. The process may be performed such that the display screen can be updated at a predetermined frame rate, for example, 30 [frame/s]. The display screen previous to rendering is replaced by the rendered image resource, thereby updating the display screen.

The image resource includes data used in rendering for updating the display screen, for example, all sorts of data used for embodying dynamic characters such as player characters, and static characters, such as mountains and rivers, forming background screen of a game.

In case that a cause of updating screen according to geostatics, for example, the first gamer 120a inputs an attack command in which the player character of the first gamer throws a weapon in the shape of a sphere, the game server 110 transmits dynamics information received from the first gamer's terminal to each terminal of the second gamers, instead of updating the display screen according to the cause of the screen update and then transmitting the updated image data to each terminal of gamers. Also, the first gamer's terminal and the second gamer's terminal perform dynamics computation by using the dynamics information, respectively.

Namely, according to the present invention, the screen update method in online game service is processed in a distributed manner because a gamer's terminal is in charge of generating images for updating a game screen.

The distributed process system is a system in which not only a server but also each terminal means perform a predetermined process and shares the data with the server or other terminal means, thereby not only improving computation efficiency but also reducing the load of the server equipment by complementing the ability of a concentrated process system (for example, a system is formed of a game server satisfactorily performs most processes and manages a plurality of game terminals receiving the result of the process).

Accordingly, in case that a display screen associated with a rigid image is updated in each terminal means such as the distributed process system, there is no need to generate a game screen image, which will be updated, in the game server and no need to transmit the game screen image to the plurality of gamer's terminals via communication network, thereby reducing the amount of data transmission.

Figure 4:
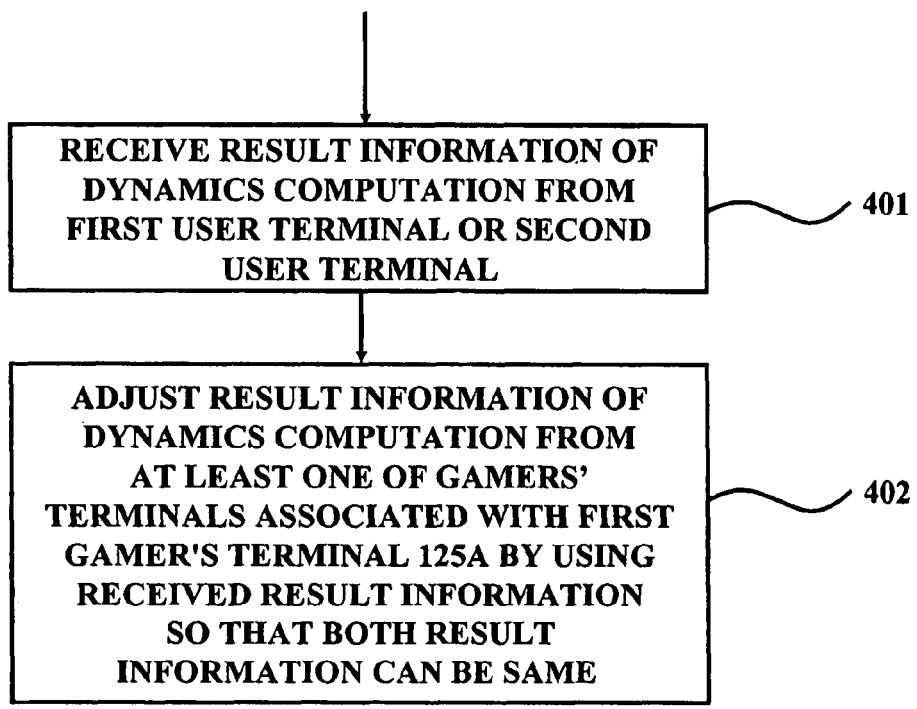
FIG. 4 is a diagram illustrating a process of adjusting the result of dynamics computation in a gamer's terminal, according to the present invention.

FIG. 4 is a diagram illustrating a process of adjusting the result of dynamics computation performed in a first gamer's terminal and each of at least one second gamer's terminal connected to the same map to which the first gamer's terminal is connected in an online game such that the game server 110 provides a game screen corresponding to each other to gamers receiving online game services from the game server 110.

As illustrated in FIG. 4, after performing the dynamics computation is completed in the first gamer's terminal 125a and the second gamer's terminal 125b, one of the first gamer's terminal 125a and the second gamer's terminal 125b or a plurality of terminal means transmit information on the result of the dynamics computation to the online game server 110. For example, the game server 110, in step 401, receives the result information of the dynamics computation from the first gamer's terminal 125a generating the dynamics computation. The online game server 110 adjusts result information of the dynamics computation from at least one of gamers' terminals associated with the first gamer's terminal 125a by using the received result information so that both the result information can be same per step 402.

Since the dynamics computation and the display screen update according to the result information of the dynamics computation are performed in each of the gamer's terminals, respectively, the result information of the dynamics computation may be different from each other according to the specific and environment of the gamer's terminal. Accordingly, the online game server 110 receives and maintains the result information of the dynamics computation from random or selected gamer's terminals connected to the same game map and the gamer's terminal including dynamics computation information that is different from the result information of the dynamics computation is adjusted so that the display screen of all the gamer's terminals can be identically updated.

The adjustment process may be periodically performed. Namely, in case that a screen update cause according to geostatics is generated in each of the gamer's terminals, the game server 110 transmits and relays the dynamics information to each gamer's terminal and may make an adjustment so that the result information of the dynamics computation of each gamer's terminal connected can be identically updated for each certain period.

Also, in case that a third gamer's terminal accesses the online game server 110 after the dynamics information is received from the first gamer's terminal, the result information of the dynamics computation transmitted to the online game server 110 is used in generating a display screen in the third gamer's terminal. Namely, the display screen in the third gamer's terminal may be generated by using the dynamics computation result information maintained by the online game server 110.

Also, according to the present embodiment, an object forming a background image may be set up as a rigid object. For example, in case that a stone of the background image is a rigid object, a gamer may input a command in which the rigid object is moved according to geostatics to a first gamer's terminal. For example, the gamer may input a command for throwing the stone in a predetermined direction with predetermined power, and the first gamer's terminal generates dynamics information according to the command. The dynamics information may include not only force applied to the rigid object, such as a stone, or direction but also information for computing the degree of the impact applied to another player character or a castle wall in case that the stone collides with the player character or the castle wall.

Accordingly, according to the present embodiment, since a player character may use a rigid object of background images as an item without using an item obtained by a predetermined item obtaining process in the online game, there are various methods of playing the online game and the fun of the online game may be increased.

Figure 5:
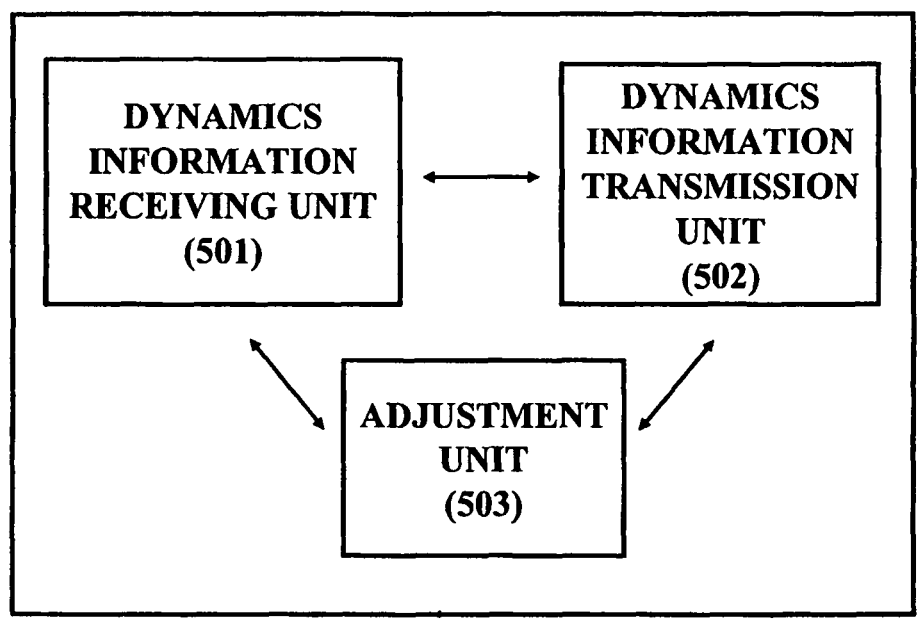
FIG. 5 is a block diagram illustrating the inner configuration of an online game server according to an embodiment of the present invention.

FIG. 5 is a block diagram illustrating the inner configuration of the online game server 500, also referred to as 110 in FIG. 1, according to an embodiment of the present invention.

Referring to FIG. 5, the online gamer server 500 includes a dynamics information receiving unit 501 and a dynamics information transmission unit 502.

The dynamics information receiving unit 501 receives predetermined dynamics information from a game server communication unit (not shown) of a first gamer's terminal. The dynamics information includes at least an attack point, or intensity of force, or direction of force associated with a predetermined object on display screen displayed in a display unit of the first gamer's terminal.

The dynamics information transmission unit 502 transmits the received dynamics information to at least one second gamer's terminal associated with the first gamer's terminal. A player character of the second gamer's terminal may be located in the same map in which a player character of the first gamer's terminal. The dynamics information is transmitted to said at least one second gamer's terminal such that the operation for updating a display screen is performed in each gamer's terminal.

Also, the online game server 500 may further include an adjustment unit 503. The adjustment unit 503 uses result information of dynamics computation received from the gamer's terminal such that the result information of the dynamics computation of the first gamer's terminal is identical with at least one gamer's terminal associated with the first gamer's terminal. Also, in case that a third user terminal is connected to the game server, a display screen may be generated in the third gamer's terminal by using the received dynamics computation result information.

Figure 6:
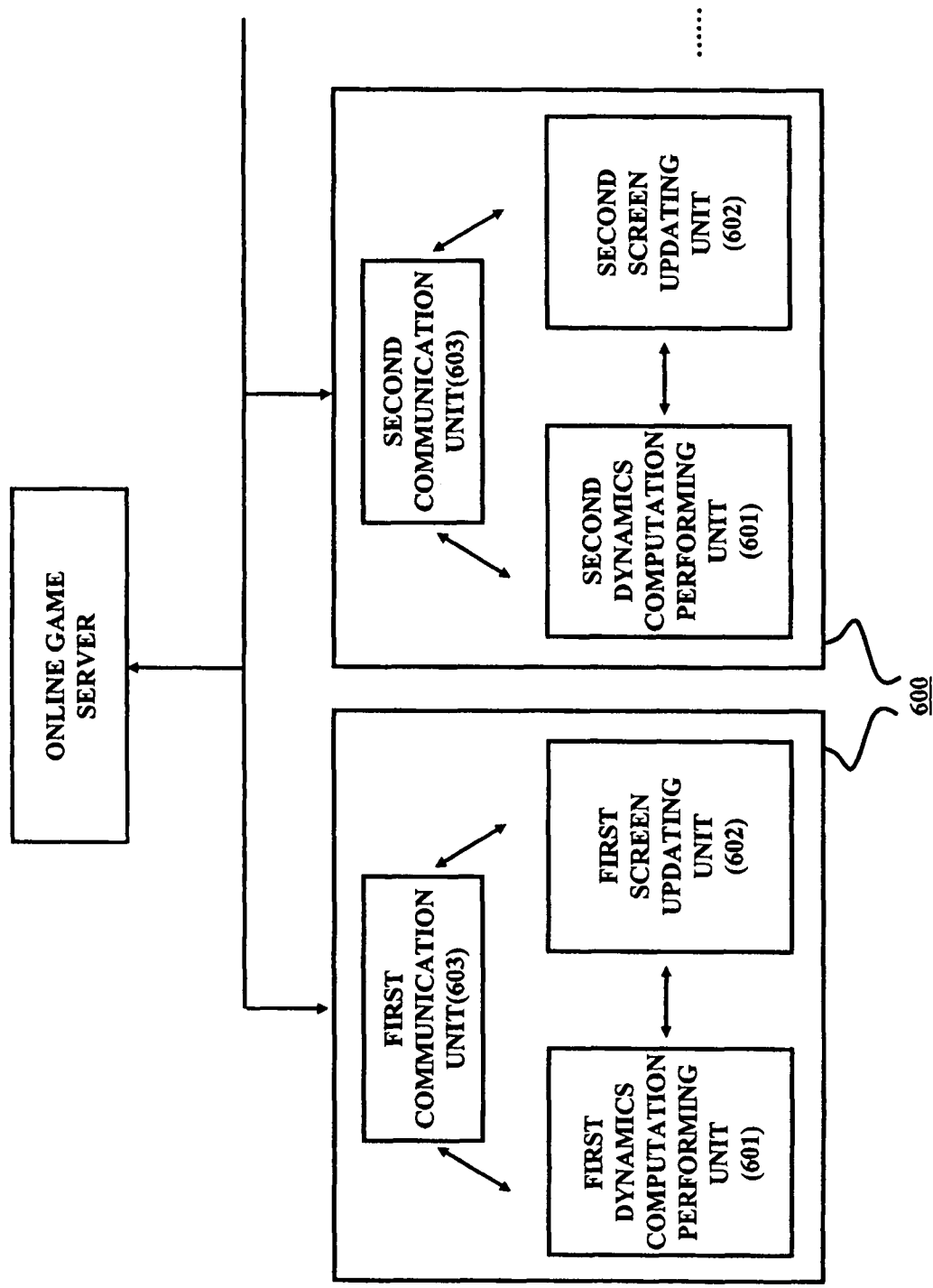
FIG. 6 is a block diagram illustrating the inner configuration of a screen update system according to the present invention.

FIG. 6 is a block diagram illustrating the inner configuration of the screen update system 600 according to an embodiment of the present invention.

As illustrated in FIG. 6, the screen update system 600 includes a dynamics computation performing unit 601, a screen updating unit 602, and a game server communication unit 603.

The dynamics computation performing unit 601 performs dynamics computation by using dynamics information generated by the command of a gamer in case of a first gamer's terminal or received dynamics information in case of a second gamer's terminal. After the dynamics computation is finished, information on the result of the dynamics computation is notified to the online game server such that the online game server can adjust the result information of the dynamics computation of a plurality of gamer's terminals to be the same.

The screen update unit 602 updates a display screen in a display unit of the first gamer's terminal and the second gamer's terminal in association with a game provided by the game server by using the result information of the dynamics computation. The process of updating a display screen, which is performed by the screen updating unit 602 includes the process of loading image resources recorded in a storage device of the second gamer's terminal, loading image resources to update on a buffer, and rendering the loaded image resources by using the result information of the dynamics computation.

Also, the game server communication unit 603 transmits dynamics information and result information of dynamics computation to the game server or receives dynamics information and result information of dynamics computation from the game server.

Also, the embodiments of the present invention include a computer readable medium including program instructions for executing various operations and realized by a computer. The computer readable medium may include program instructions, a data file, and a data structure, separately or collectively. The program instructions and the media may be those specially designed and constructed for the embodiments of the present invention, or they may be of the kind well known and available to those skilled in the art of computer software arts.

Figure 7:
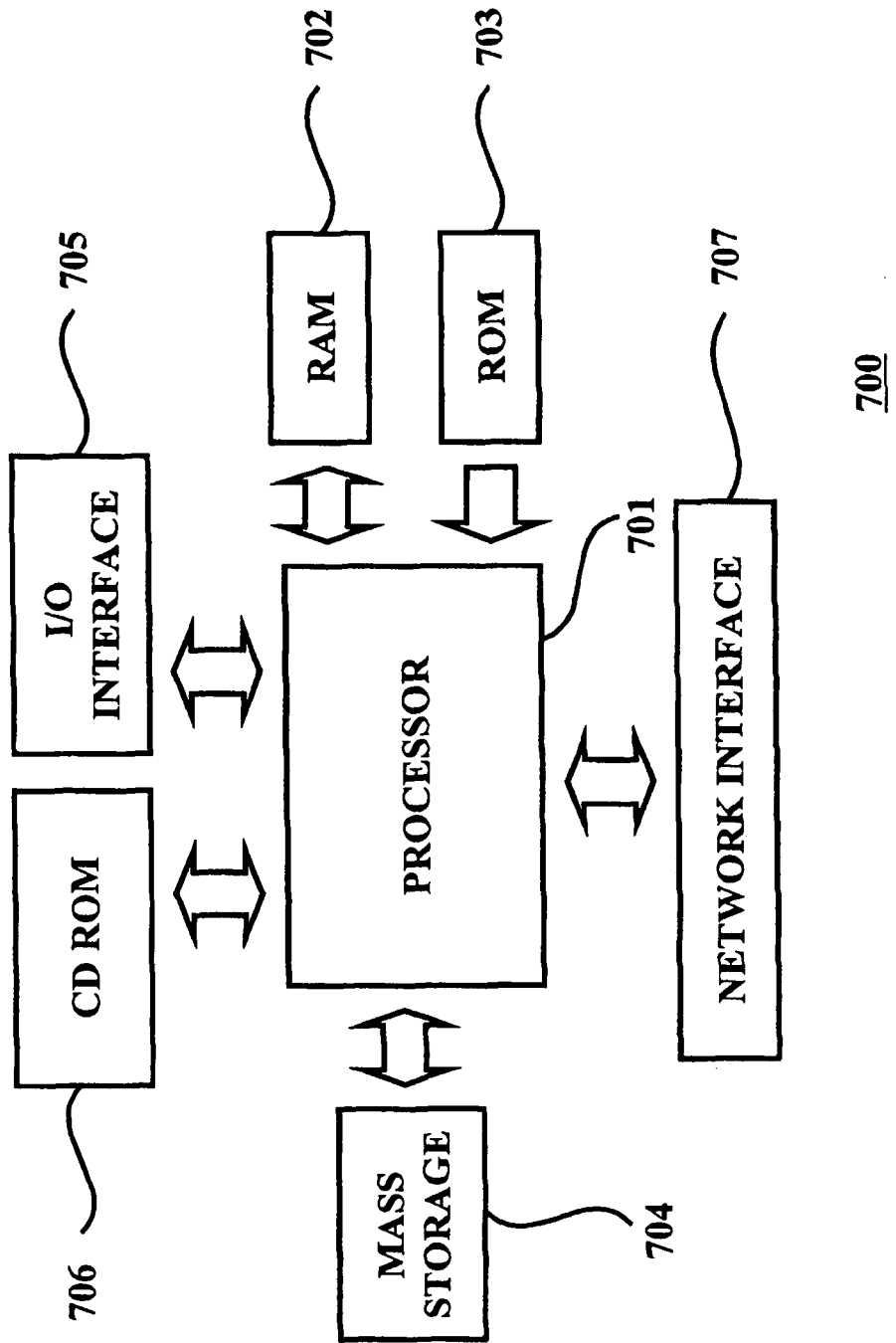
FIG. 7 is a block diagram illustrating the inside of a general use computer apparatus that may be employed in performing the screen update method according to an embodiment of the present invention.

FIG. 7 is a block diagram illustrating a computer apparatus 700 which includes at least one processor 701 connected to a main memory device including a RAM (Random Access Memory) 702 and a ROM (Read Only Memory) 703. The processor 701 is also known as a central processing unit CPU. As well-known in the field of the art, the ROM 703 unidirectionally transmits data and instructions to the CPU, and the RAM 702 is generally used for bidirectionally transmitting data and instructions. The RAM 702 and the ROM 703 may include a certain proper form of a computer readable recording medium. A mass storage device 704 is bidirectionally connected to the processor 701 to provide additional data storage capacity and may be one of number of computer readable recording mediums. The mass storage device 704 is used for storing programs and data and is an auxiliary memory. A particular mass storage device such as a CD ROM 706 may be used. The processor 701 is connected to at least one input/output interface 705 such as a video monitor, a track ball, a mouse, a keyboard, a microphone, a touch-screen type display, a card reader, a magnetic or paper tape reader, a voice or hand-writing recognizer, a joy stick, or other known computer input/output unit. The processor 701 may be connected to a wired or wireless communication network via a network interface 707. The procedure of the described method can be performed via the network connection. The described devices and tools are well-known to those skilled in the art of computer hardware and software.

The described hardware devices may be formed to be operated by at least one software module in order to perform the operations of the present invention.

While this invention has been particularly shown and described with reference to embodiments thereof, various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

INDUSTRIAL APPLICABILTY

To solve the problems described above, the present invention provides a screen update method and system in which an online game server transmits dynamics information generated in each gamer's terminal to other gamer's terminal connected to the identical game map and dynamics computation and display screen update are performed, respectively, by using the transmitted dynamics information in each gamer's terminal.

Also, according to the present invention, dynamics computation and display screen update are performed in each gamer's terminal instead of a game server, thereby reducing the amount of data processed by the game server. Particularly, the amount of the data processed in the game server is reduced, thereby smoothly providing 3D MMORPG services without increasing the quality and quantity of the game server(s).

Also, according to the present invention, the game server rapidly transmits and relays dynamics information required in each gamer's terminal to the gamer's terminal, thereby reducing the time required in generating game screen image updated in the gamer's terminal. Namely, since it is not necessary that the game server performs an additional process before the dynamics information is transmitted to the gamer's terminal, the gamer's terminal may rapidly receive required dynamics information and the time required in updating a game screen image may be reduced.

What is claimed is:

1. A gaming method for distributing game image data update processes by a server, comprising:
    establishing connections over a data network with a first terminal and a second terminal of a first terminal group the first terminal group being associated with a plurality of users participating in plays of a game through the data network;
    processing game image data to provide a game play screen image to the first terminal group, the game play screen image being configured to be updated by being at least partially processed by the first terminal group to generate an updated screen image;
    receiving motion information of a game object from the first terminal, via the data network, the received motion information of the game object corresponding to a background object manipulated by an action of a game character and that is computed by the first terminal; and
    transmitting the received motion information of the game object to the second terminal via the data network to control the second terminal to compute the motion information of the game object in the game play screen image of the second terminal, and to control the first terminal and the second terminal to update the screen images of the first terminal and the second terminal according to the computed motion information, respectively computed by the first terminal and the second terminal, and to output the motion information to the first terminal and the second terminal by synchronizing the updated display screens.

2. A non-transitory computer readable storage medium comprising an executable program, which when executed, performs the method of claim 1.

3. A gaming method of distributing processes of motion information updates of display screens of user terminals communicating with a gaming server via a network, the method comprising:
    establishing data network connections with a plurality of user terminals comprising a first terminal group the first terminal group being associated with a plurality of users participating in plays of a game through the data network;
    processing game image data to provide a game play screen image to the first terminal group, the game play screen image being configured to be updated by being at least partially processed by the first terminal group to generate an updated screen image;
    receiving motion information of a game object processed and computed by the first terminal group;
    adjusting the received motion information of a game object to be substantially compatible with the motion information of the respective user terminals of the first terminal group to be updated, the received motion information being configured to be adjusted such that adjusted computing results of the motion information for the respective user terminals of the first terminal group are matched with each other; and
    transmitting the adjusted motion information to the respective user terminals of the first terminal group to update the motion information for the respective user terminals of the first terminal group by using the adjusted motion information.

4. The method of claim 3, wherein the received motion information comprises mechanics information, dynamics information and statics information of the object.

5. The method of claim 4, wherein the dynamics information comprises attack point, magnitude of force, direction of force, effect of attack, and counter force of the object.

6. The method of claim 4, wherein the received motion information comprises dynamics information of the object interacting with a background.

7. The method of claim 3, wherein adjusting is performed periodically.

8. The method of claim 3, further comprising:
transmitting the motion information of a first user terminal and the motion information of a second user terminal to a third user terminal communicating with the server via the network; and
updating a game progressing event of a display screen of the third terminal by controlling the third terminal, wherein the updating is configured to be performed at least partially by the third terminal by a computation of the received motion information of the first user terminal and the motion information of the second user terminal.

9. The method of claim 3, wherein the object comprises a rigid object, and wherein adjusting is based at least in part on geostatics.

10. A non-transitory computer readable storage medium comprising an executable program, which when executed, performs the method of claim 3.

11. A gaming method of distributing processes of motion information updates of a display screen of a first terminal group comprising a first terminal and a second terminal which are communicating with a server via a network, the method comprising:
establishing data network connections with a plurality of terminals comprising the first terminal group the first terminal group being associated with a plurality of users participating in plays of a game through the data network;
processing game image data to provide a game play screen image to the first terminal group, the game play screen image being configured to be updated by being at least partially processed by the first terminal group to generate an updated screen image;
receiving motion information of a game object from the second terminal;
transmitting the motion information corresponding to the second terminal to the first terminal;
controlling the first terminal to compute the motion information of the game object and to perform a rendering process of the game play screen image for generating an updated screen image; and
updating the display screen of the first terminal based on the computed motion information, wherein the updating is performed by loading an image resource corresponding to the game screen image and updating a display screen with an image rendered by the first terminal, and
wherein a display screen of the second terminal is updated by processing the motion information by the second terminal via communicating with the server.

12. The method of claim 11, wherein the motion information of the first terminal comprises motion information generated by a plurality of control commands executed at the first terminal for an object in a background.

13. The method of claim 11, wherein the motion information comprises dynamics information and statics information of the object.

14. The method of claim 13, wherein the dynamics information comprises attack point, magnitude of force, direction of force, effect of attack, and counter force of the object.

15. The method of claim 11, wherein the object comprises a rigid object, and wherein adjusting is performed based at least in part on geostatics.

16. A non-transitory computer readable storage medium comprising an executable program, which when executed, performs the method of claim 11.

17. A gaming system to distribute processes of motion information updates of display screens of a first terminal group, comprising:
a network interface to establish data network connections with a plurality of user terminals comprising a first terminal group the first terminal group being associated with a plurality of users participating in plays of a game through the data network;
a server comprising a processor configured to process game image data to provide a game play screen image to the first terminal group, and to receive motion information of a game object from the first terminal group, the screen image being configured to be updated by being at least partially processed by the first terminal group to generate an updated screen image;
a motion adjuster, coupled to the server, configured to adjust the received motion information received from the first terminal group such that adjusted computing results of the motion information for the respective user terminals of the first terminal group are matched with each other, the adjustment being associated with a game progressing event and performed by the server via a network, wherein each of the motion information is computed and processed by the respective user terminals of the first terminal group; and
a motion information transmitter, coupled to the server, configured to transmit the adjusted motion information to the respective user terminals of the first terminal group.

18. A gaming system of distributing processes of motion information updates of display screens of a first terminal group comprising a first terminal and a second terminal which are communicating via a network, the system comprising:
a server comprising:
a network interface to establish data network connections with a plurality of terminals comprising the first terminal group the first terminal group being associated with a plurality of users participating in plays of a game through the data network; and
a processor configured to process game image data to provide a game play screen image to the first terminal group, and to receive and transfer motion information of a game object, the game play screen image being configured to be updated by being at least partially processed by the first terminal group to generate an updated screen image, the received motion information associated with a game progressing event corresponding to each display screen of the terminals of the first terminal group;
the first terminal of the first terminal group configured to update a display screen of the first terminal by computing the motion information of the game object transferred from the server, the display screen being associated with the game progressing event which is provided by the server via the network; and a motion adjuster circuit, coupled to the server, configured to adjust motion information of the first terminal to be substantially compatible with motion information of the second terminal communicating with the first terminal via the server, wherein the second terminal computes motion information of the second terminal, and the second terminal further updates screen image provided to the second terminal.

19. The system of claim 18, wherein one of the first terminal and the second terminal further comprises a server communicator configured to transmit the result of the computation of motion information to the server.

20. The system of claim 18, wherein the motion information comprises mechanics information, and wherein the mechanics information comprises dynamics information and statics information of the object.

21. A gaming server to distribute processes of dynamics information updates of display screens of a first terminal group, comprising:

a network interface to establish data network connections with a plurality of terminals comprising a first terminal group the first terminal group being associated with a plurality of users participating in plays of a game through the data network;

a processor configured to process a three-dimensional image data to provide a three-dimensional game play screen image to the first terminal group, and to receive computation data of dynamics information of a game object, the computation data calculated by a plurality of terminals of the first terminal group, and to adjust the received computation data according to a different condition of each of the terminals of the first terminal group, the computation data transmitted from each of the terminals of the first terminal group connected to a game map via a network, wherein the network interface configured to transmit the adjusted computation data to the respective terminals to control each of the terminals of the first terminal group identically to update the dynamics information on a display screen of each of the terminals by using the adjusted computation data and performing a rendering process on the three-dimensional image data based on the adjusted computation data.

22. A gaming method for rendering image data of a game play screen image by a user terminal to generate an updated three-dimensional screen image, comprising:

establishing, by a first user terminal of a first terminal group, a data network connection with a server connected to a plurality of user terminals comprising the first terminal group the first terminal group being associated with a plurality of users participating in plays of a game through the data network;

receiving, from the server, processed game image data for a three-dimensional game play screen image for the first terminal group, the three-dimensional game play screen image being configured to be updated by being at least partially processed by the first terminal group to generate an updated screen image;

transmitting motion information of a game object from a first terminal, via a data network, the motion information being computed by the first terminal such that other user terminals in the first terminal group perform a rendering process based on the transferred motion information to update the three-dimensional game play screen image for the first terminal group; and receiving motion information of a game object generated by a second terminal of the first terminal group, and to update a display screen of the first terminal by performing a rendering process of image data processed and received from the server based on the motion information of a game object generated by the second terminal.

* * * * *